(12) United States Patent
Strecker et al.

(10) Patent No.: US 8,715,764 B2
(45) Date of Patent: May 6, 2014

(54) EUTECTIC MIXTURES OF ESTERIFIED PROPOXYLATED GLYCEROLS WITH DIGESTIBLE FATS

(75) Inventors: Leopold Strecker, Warren, NJ (US); David Stewart Rowe, Indianapolis, IN (US); James Louis Flowers, Greenville, SC (US); Dana Overman, Roswell, GA (US)

(73) Assignees: Choco Finesse LLC, Lenexa, KS (US); Kansas State University Institute for Commercialization, Manhattan, KS (US)

( * ) Notice: Subject to any disclaimer, the term of this patent is extended or adjusted under 35 U.S.C. 154(b) by 0 days.

(21) Appl. No.: 13/529,637

(22) Filed: Jun. 21, 2012

(65) Prior Publication Data

US 2013/0344193 A1 Dec. 26, 2013

(51) Int. Cl.
- *A23D 9/007* (2006.01)
- *C07H 11/00* (2006.01)
- *C07H 13/02* (2006.01)

(52) U.S. Cl.
USPC ................ 426/611; 536/115; 536/119

(58) Field of Classification Search
USPC ........................................... 426/611
See application file for complete search history.

(56) References Cited

U.S. PATENT DOCUMENTS

| | | | |
|---|---|---|---|
| 4,861,613 A | 8/1989 | White et al. | |
| 4,983,329 A | 1/1991 | Cooper | |
| 5,102,683 A | 4/1992 | Letton et al. | |
| 5,158,796 A | 10/1992 | Bernhardt et al. | |
| 5,175,323 A | 12/1992 | Cooper | |
| 5,304,665 A | 4/1994 | Cooper et al. | |
| 5,306,516 A | 4/1994 | Letton et al. | |
| 5,308,640 A | 5/1994 | Baer et al. | |
| 5,374,446 A | 12/1994 | Ferenz et al. | |
| 5,387,429 A * | 2/1995 | Cooper | 426/611 |
| 5,399,728 A | 3/1995 | Cooper | |
| 5,427,815 A | 6/1995 | Ferenz | |
| 5,494,693 A * | 2/1996 | Cooper | 426/531 |
| 5,512,313 A * | 4/1996 | Cooper et al. | 426/611 |
| 5,516,544 A * | 5/1996 | Sekula et al. | 426/611 |
| 5,589,217 A | 12/1996 | Mazurek | |
| 5,597,605 A | 1/1997 | Mazurek | |
| 5,603,978 A | 2/1997 | White et al. | |
| 5,635,236 A | 6/1997 | Cooper | |
| 5,641,534 A | 6/1997 | White et al. | |
| 5,681,939 A | 10/1997 | Ferenz | |
| 5,986,117 A * | 11/1999 | Cooper | 554/168 |
| 6,077,556 A | 6/2000 | Letton et al. | |
| 6,268,010 B1 * | 7/2001 | Sekula | 426/611 |
| 6,361,817 B1 * | 3/2002 | Sekula et al. | 426/633 |
| 6,495,188 B2 * | 12/2002 | Mazurek et al. | 426/607 |
| 6,518,226 B2 * | 2/2003 | Volker et al. | 508/485 |
| 7,241,468 B2 | 7/2007 | Naber et al. | |

FOREIGN PATENT DOCUMENTS

| | | |
|---|---|---|
| WO | 89/00134 | 1/1989 |
| WO | 97/02260 | 1/1997 |
| WO | 97/22261 | 6/1997 |

OTHER PUBLICATIONS

Minifie, B. W. 1980. Chocolate, Cocoa and Confectionery: Science and Technology, $2^{nd}$ edition. AVI Publishing Company, Inc., Westport, CT. pp. 75, 80-86.*

* cited by examiner

*Primary Examiner* — Carolyn Paden
(74) *Attorney, Agent, or Firm* — RatnerPrestia

(57) ABSTRACT

Disclosed are methods for producing esterified propoxylated glycerols and eutectic mixtures containing one or more esterified propoxylated glycerols and one or more digestible fats. Food products containing the eutectic mixtures are also disclosed.

29 Claims, 6 Drawing Sheets

(a) – 100% EPG, Melting point 38.0°C
(b) – 100% Cocoa Butter, Melting Point 36.5°C
(c) – 50/50 Blend of Cocoa Butter/EPG, Melting Point 33.5°C a) 100% EPG-05(B16), Mettler Drop Point 39.1 °C
b) 100% FPKO, Mettler Drop Point 34.2 °C
c) 50/50 Blend of EPG-05(B16)/ FPKO, Mettler Drop Point 31.4 °C

EUTECTIC MIXTURES OF ESTERIFIED PROPOXYLATED GLYCEROLS WITH DIGESTIBLE FATS

INTRODUCTION

Non-digestible fats when ingested may remain liquid in the digestive tract resulting in an undesirable side-effect of pooling and leaking from the anal sphincter. One method of preventing pooling in the gut of non-absorbable fats is to increase the melting point of the non-absorbable fats above human body temperature (37-39° C.). When solid in the gut, these fats will not pool and are thus eliminated as a solid material. However, high-melting fats create other problems, such as "waxy mouthfeel" or food products (such as confectionery or chocolate) that are too hard, and may leave a "greasy residue" (such as with French fries) on food surfaces.

SUMMARY

In one aspect, provided is a method of formulating a food product by adding to at least one food component, a digestible fat and an esterified propoxylated glycerol having a solid fat index (or solid fat content) of at least about 60, 65 or 70 at 20° C., the digestible fat and esterified propoxylated glycerol being added in amounts sufficient to form a eutectic mixture having a melting temperature below about 37° C., 36.5° C., 36° C. or 35.5° C., thereby formulating the food product. The food product can comprise chocolate, such as chocolate having all or substantially all of the fat being cocoa butter or a combination of cocoa butter and dairy fat, or can comprise compound chocolate comprising a vegetable fat such as palm oil, palm kernel, fractionated palm kernel oil, coconut oil and babassu oil in fractionated or hydrogenated states and any combination thereof. The food product can be selected from at least one of a snack bar, candy, coating, topping, filling, baking chip, cookie, cracker, sweet good, snack cake, pie, granola bar, toaster pastry, potato chip, corn chip, tortilla chip, extruded snack, popcorn, pretzel, potato crisp, nut spread, dip, spread, dried fruit, meat snack, pork rind, rice cake, corn cake, dried vegetable, brownie, filled cracker, filled extruded snack, enrobed extruded snack, cheese curl, cheese crunch, cheese stick, onion ring, pizza chip, potato chip, potato skin, potato stick, veggie stick, pretzel, a nougat, malted milk balls, aerated milk chocolate, or puffed snack. The food product can be substantially free of partially digestible fats which have a solid fat index (or solid fat content) of less than about 50 at 21° C. The esterified propoxylated glycerol used in the method can have a degree of propoxylation of about 3 to about 8, or about 4 to about 6, or about 5, a melting temperature of at least about 38° C., a melting temperature of about 38° C. to about 39° C., or any combination thereof disclosed herein. The digestible fat can include at least one cocoa butter, fractionated fat, palm kernel oil, coconut oil or babassu oil, which may be in natural, fractionated or hydrogenated states. The ratio of esterified propoxylated glycerol:digestible fat can be from about 95:5 to about 5:95, from about 75:25 to about 25:75, or any ratio disclosed herein. The digestible fat and the esterified propoxylated glycerol can be combined before being added to the at least one food component.

In another aspect, provided is an edible product, such as one or more varieties of chocolate described herein, comprising an esterified propoxylated glycerol having a melting temperature of at least about 37.5° C., and a digestible fat; the esterified propoxylated glycerol and the digestible fat being present in amounts sufficient to form a eutectic mixture melting at a temperature below about 37° C. The product is substantially free of partially digestible fats which have a solid fat index (or solid fat content) of less than about 50 at 21° C. The esterified propoxylated glycerol used in the method can have a degree of propoxylation of about 3 to about 8, or about 4 to about 6, or about 5, a melting temperature of at least about 38° C., a melting temperature of about 38° C. to about 39° C., or any combination thereof. The digestible fat can include at least one of cocoa butter, a fractionated fat, palm kernel oil, coconut oil or babassu oil in natural or hydrogenated states, or any combination thereof. The ratio of esterified propoxylated glycerol:digestible fat can be from about 95:5 to about 5:95, from about 75:25 to about 25:75, or any ratio disclosed herein. The edible product can include one or more of a candy, a snack bar, a topping, a filling, a coating, a baking chip, a cookie, a cracker, a sweet good, a snack cake, a pie, a granola bar, a toaster pastry, a potato chip, a corn chip, a tortilla chip, an extruded snack, a popcorn, a pretzel, a potato crisp, a nut spread, a dip, a spread, a dried fruit, a meat snack, a pork rind, a rice cake, a corn cake, a dried vegetable, a brownie, a filled cracker, a filled extruded snack, an enrobed extruded snack, a cheese ball, a cheese curl, a cheese crunch, a cheese stick, an onion ring, a pizza chip, a potato chip, a potato skin, a potato stick, a veggie stick, a pretzel, a nougat, malted milk balls, aerated milk chocolate, or a puffed snack.

In another aspect, a method of reducing or preventing passive oil loss of esterified propoxylated glycerol from the digestive tract of a subject is provided. The method can include administering one or more of the edible products described in the preceding paragraph, and elsewhere herein, to a subject, wherein the digestible fat is digested and absorbed and the esterified propoxylated glycerol solidifies in the digestive tract thereby reducing passive oil loss. The passive oil loss can be eliminated in the subject.

In another aspect, a method of reducing or eliminating the waxiness at 35° C. of an edible product comprising an esterified propoxylated glycerol having a solid fat index (or solid fat content) of at least about 60 at 20° C. is provided. The method can include adding to the edible product a digestible fat in an amount sufficient to form a eutectic mixture having a melting temperature below about 37° C. The edible product may have no discernable waxiness.

BRIEF DESCRIPTION OF THE DRAWINGS

FIG. 3 illustrates the eutectic effect of EPG-05 (B16) and fractionated palm kernel oil blends on Mettler drop point.

DETAILED DESCRIPTION

Figure 1:
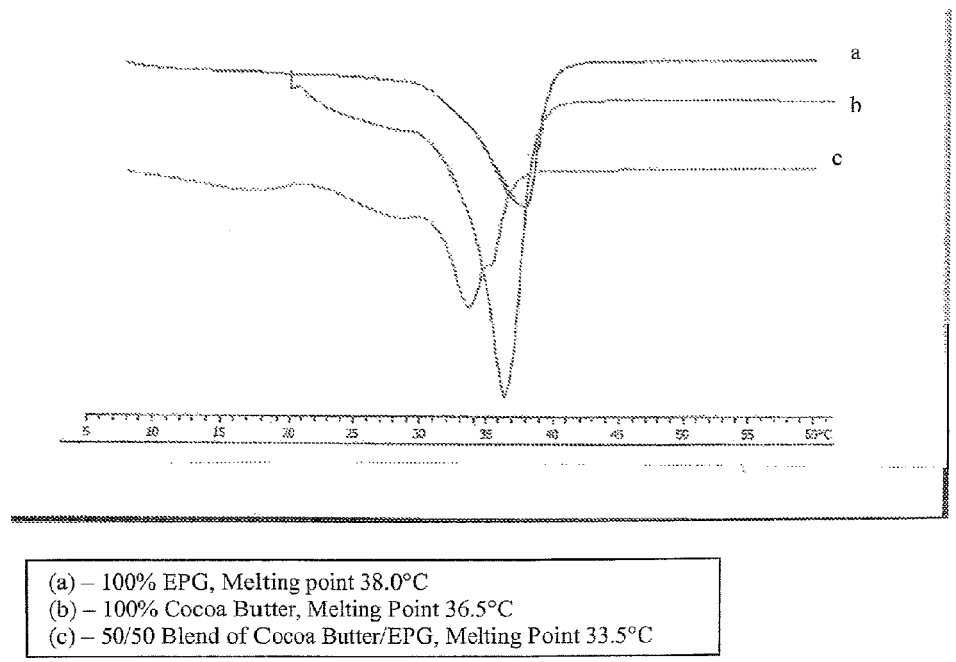
FIG. 1 is a graph showing differential scanning calorimetry (DSC) curves of the melting points of cocoa butter, an esterified propoxylated glycerol, and a blend (50/50) pf cocoa butter and the esterified propoxylated glycerol.

The present disclosure relates to fat compositions which contain eutectic mixtures of particular esterified propoxylated glycerol and digestible fats. Esterified propoxylated glycerols (EPGs) are structurally similar to triglycerides but contain propylene oxide between the glycerol and fatty acid chains to form "extended" glycerides. EPGs are not recognizable by lipases and fat digesting enzymes, and are passed through the digestive tract essentially intact, thus providing no calories. The food products described herein have textural or taste benefits including at least one of reduced waxiness, improved mouthmelt or mouthfeel, as well as a reduction in the undesirable laxative effect of passive oil loss through the anal sphincter, which might otherwise occur following the ingestion of EPGs that are liquid at human body temperature. Methods of formulating such food products are also provided.

The present disclosure provides novel methods for formulating food products, and novel food products comprising esterified propoxylated glycerol combined with digestible fat to form a eutectic mixture, having a decreased melting point below the melting points of the individual components. Generally, eutectic properties are considered to be a negative in the formulation of food products, particularly in chocolate and confectionery products, because they result in softer than desired texture, lack of "snap" when breaking chocolate bars, and soft surface leaving melted chocolate on fingers. However, the inventor found that combining one or more EPGs with a digestible fat such as cocoa butter, margarine fat, baking shortening, butter fat produces a eutectic mixture that has a surprisingly low melting temperature, providing the food product with at least one of reduced waxiness and an improved mouthfeel. Furthermore, upon ingestion of the food products containing the eutectic mixture, passive oil loss is reduced or eliminated, compared with the food product containing a similar amount of an EPG having the same melting temperature as the melting temperature of the eutectic mixture. The digestible portion of the eutectic fat mixture is absorbed in the digestive tract, whereas the non-absorbed EPG remains solid in the gut and is excreted in solid form. The food product containing the eutectic mixture also exhibits reduced waxiness and improved mouthfeel compared with the food product containing the EPG but not containing the eutectic mixture.

Accordingly, at least one of passive oil loss and waxiness properties of food products is reduced by forming eutectic mixtures of EPGs and digestible fats. Suitable EPGs include those synthesized to have a high melting point (for example from at least about 37° C. to about 39° C., above human body temperature). A single type of EPG may be used, or a combination of different EPGs may be used. Prior to forming the eutectic mixture with the digestible fat, the melting point temperature of the EPG or combination of EPGs is, for example, at least about, or at least, 37.0° C., 37.1° C., 37.2° C., 37.3° C., 37.4° C., 37.5° C., 37.6° C., 37.7° C., 37.8° C., 37.9° C., 38.0° C., 38.1° C., 38.2° C., 38.3° C., 38.4° C., 38.5° C., 38.6° C., 38.7° C., 38.8° C., 38.9° C., 39.0° C., 39.1° C., 39.2° C., 39.3° C., 39.4° C., 39.5° C., 39.6° C., 39.7° C., 39.8° C., 39.9° C., 40.0° C., 40.1° C., 40.2° C., 40.3° C., 40.4° C., 40.5° C., 40.6° C., 40.7° C., 40.8° C., 40.9° C., 41.0° C., 41.1° C., 41.2° C., 41.3° C., 41.4° C., 41.5° C., 41.6° C., 41.7° C., 41.8° C., 41.9° C., or 42.0° C. The melting point temperature of the EPG or combination of EPGs is, for example, less than about, or less than, 55° C., 50° C., 49° C., 48° C., 47° C., 46° C., 45° C., 44° C., 43° C., 42° C., 41° C., 40° C. or 39° C. When combinations of EPGs are used, the combination may have one of these values, or each of the EPGs in the combination may, independently, have one of these values.

The term polyol fatty acid polyester includes polyols which have two or more hydroxyl groups esterified with fatty acid groups. The polyol may be esterified with four or more fatty acid groups. Polyol fatty acid polyesters include sucrose polyesters having on average at least four, or at least about five, ester linkages per molecule of sucrose; the fatty acid chains may have from about eight to about twenty-four carbon atoms. Other polyol fatty acid polyesters are esterified linked alkoxylated glycerols, including those comprising polyether glycol linking segments, as described in U.S. Pat. No. 5,374,446, incorporated herein by reference, and those comprising polycarboxylate linking segments, as described in U.S. Pat. Nos. 5,427,815 and 5,516,544, incorporated herein by reference; more preferred are those described in U.S. Pat. No. 5,516,544.

Additional polyol fatty acid polyesters are esterified epoxide-extended polyols of the general formula P(OH)A+C(EPO)N (FE)B wherein P(OH) is a polyol, A is from 2 to about 8 primary hydroxyls, C is from about 0 to about 8 total secondary and tertiary hydroxyls, A+C is from about 3 to about 8, EPO is a $C_3$ $C_6$ epoxide, N is a minimum epoxylation index average number, FE is a fatty acid acyl moiety and B is an average number ranging from greater than 2 and no greater than A+C, as described in U.S. Pat. No. 4,861,613 and EP 0324010 A1, incorporated herein by reference. The minimum epoxylation index average number has a value generally equal to or greater than A and is a number sufficient so that greater than 95% of the primary hydroxyls of the polyol are converted to secondary or tertiary hydroxyls. The fatty acid acyl moiety may have a $C_7$-$C_{23}$ alkyl chain.

Esterified epoxide-extended polyols such as esterified propoxylated glycerols may be generally prepared by reacting a propoxylated glycerol having from 2 to 100 oxypropylene units per glycerol with $C_{10}$-$C_{24}$ fatty acids or with $C_{10}$-$C_{24}$ fatty acid esters, as described in U.S. Pat. Nos. 4,983,329 and 5,175,323, respectively, both incorporated herein by reference. Esterified propoxylated glycerols may be prepared by reacting an epoxide and a triglyceride with an aliphatic polyalcohol, as described in U.S. Pat. No. 5,304,665, incorporated herein by reference, or with an alkali metal or alkaline earth salt of an aliphatic alcohol, as described in U.S. Pat. No. 5,399,728, incorporated herein by reference. Suitable acylated propylene oxide-extended glycerols having a propoxylation index of above about 2, in the range of from about 2 to about 8, or about 3, 4 or 5 or above, wherein the acyl groups are $C_8$-$C_{24}$, or $C_{14}$-$C_{18}$, compounds, as described in U.S. Pat. Nos. 5,603,978 and 5,641,534, both incorporated herein by reference. Fatty acid-esterified propoxylated glycerols may have a dilatomeric solid fat index at 92° F. (33° C.) of less than about 30, as described in WO 97/2260, or may have a dilatomeric solid fat index of at least about 50 at 70° F. (21° C.) and at least about 10 at 98.6° F. (37° C.), as described in U.S. Pat. Nos. 5,589,217 and 5,597,605, both incorporated herein by reference.

EPGs may be prepared by reacting propoxylated glycerol having from about 2 to about 8 oxypropylene oxide units per glycerin, with an excess of a saturated or unsaturated $C_8$ to $C_{24}$ fatty acid or mixtures thereof, at temperatures of from about 100° C. to about 250° C. Processes for forming EPGs are disclosed, for example, in U.S. Pat. No. 5,681,939 issued Oct. 28, 1997, the entire disclosure of which is herein incorporated by reference in its entirety. Examples of $C_8$ to $C_{24}$ fatty acids which may be employed include, without limitation, saturated acids, such as, caprylic acid, capric acid, lauric acid, myristic acid, palmitic acid, stearic acid, arachidic acid, behenic acid and combinations thereof. Examples of unsaturated acids which may be employed include, but are not limited to, oleic acid, linoleic acid, α-linolenic acid, arachidonic acid, eicosapentaenoic acid, erucic acid, docosahexaenoic acid, palmitoleic acid, eicosenoic acid, and combinations thereof. The fatty acids may be naturally occurring or synthetically produced. Similarly, mixtures of fatty acids may be used including those mixtures obtained by splitting natural or modified triglycerides, such as babassu oil, canola oil, cocoa butter, coconut oil, corn oil, cottonseed oil, jojoba oil, lard, meadowfoam oil, menhaden oil, olive oil, palm oil, palm kernel oil, peanut oil, rapeseed oil, rice bran oil, safflower oil, sesame seed oil, soybean oil, sunflower oil and tallow, or fully or partially hydrogenated mixtures or fractionated mixtures thereof.

The melting temperature of the EPG compound prior to or while forming the eutectic mixture can be altered by the particular fatty acids used to form the EPG, such as is described herein, or by altering the degree of propoxylation of the glycerol, such as is described herein.

The EPG or combination of EPGs used to form the eutectic mixture with a digestible fat may have a solid fat index of at least about, or at least, 60 at 20° C., 61 at 20° C., 62 at 20° C., 63 at 20° C., 64 at 20° C., 65 at 20° C., 66 at 20° C., 67 at 20° C., 68 at 20° C., 69 at 20° C., 70 at 20° C., 71 at 20° C., 72 at 20° C., 73 at 20° C., 74 at 20° C., 75 at 20° C., 76 at 20° C., 77 at 20° C., 78 at 20° C., 79 at 20° C., 80 at 20° C., 81 at 20° C., 82 at 20° C., 83 at 20° C., 84 at 20° C., 85 at 20° C., 86 at 20° C., 87 at 20° C., 88 at 20° C., 89 at 20° C., 90 at 20° C., 91 at 20° C., 92 at 20° C., 93 at 20° C., 94 at 20° C., 95 at 20° C., 96 at 20° C., 97 at 20° C., 98 at 20° C., or 99 at 20° C. When combinations of EPGs are used, the combination may have one of these values, or each of the EPGs in the combination may, independently, have one of these values.

The EPG may have a degree of propoxylation of at least about, or at least, 2, 2.5, 3, 3.5, 4, 4.5, 5, 5.5, 6, 6.5, 7, 7.5 or 8 and less than about, or less than, 10, 9.5, 9, 8.5, 8, 7.5, 7, 6.5 or 6. In certain embodiments, the EPG has a degree of propoxylation of about 5.

For example, EPG having a degree of propoxylation of 3 will, in certain embodiments, have predominantly a combination of palmitic and stearic acids to achieve melting temperature range of 38-39° C. Such fatty acids are available from fully hydrogenated palm oil, or can be sourced from a broad range of edible oils, including, without limitation, soybean oil, canola oil, corn oil, coconut oil, palm kernel oil, sunflower oil, cottonseed oil, safflower oil, peanut oil and combinations thereof.

EPG having a degree of propoxylation of 5 may, for example, incorporate fatty acids containing mostly $C_{16}$ and $C_{18}$ chains, which are readily available from edible oils including soybean oil, corn oil, canola oil, sunflower oil, safflower oil, cottonseed oil and peanut oil, and a significant proportion of C22 chains from high erucic acid rapeseed oil (HERO). Erucic fatty acid (C22:1) can be converted to behenic acid (C22:0) by conventional hydrogenation. For example, EPG having a degree of propoxylation of 5 may achieve a melting point of about 38-39° C. using about 60% stearic acid (C18:0), 30% behenic acid (C22:0), 9% palmitic acid (C16:0), and 1% gadoleic acid (C20:0). These proportions of fatty acids may be obtained by blending soybean oil fatty acids (about 15%) with HERO fatty acids (about 85%) and fully hydrogenating them to convert unsaturated to saturated fatty acids.

EPG having a degree of propoxylation of 8 may, for example, incorporate about 50% behenic acid (C22:0) to achieve a melting point of 38-39° C. HERO varieties naturally produce 35-45% erucic acid (C22:1), and fully hydrogenated HERO fatty acids may be enhanced with distilled behenic acid (C22:0) to obtain the desired melting point.

Examples of digestible fats include, without limitation, cocoa butter, a fractionated fat, palm oil stearine, palm kernel oil, fractionated palm kernel oil, coconut oil, babassu oil, lard, tallow, butter fat or a combination thereof, in natural, fractionated or hydrogenated states.

In certain embodiments, the eutectic mixture containing the EPG and the digestible fat exhibits a melting point below 37° C., such as, for example, less than about, or less than, 36.9° C., 36.8° C., 36.7° C., 36.6° C., 36.5° C., 36.4° C., 36.3° C., 36.2° C., 36.1° C., 36.0° C., 35.9° C., 35.8° C., 35.7° C., 35.6° C., 35.5° C., 35.4° C., 35.3° C., 35.2° C., 35.1° C., 35.0° C., 34.9° C., 34.8° C., 34.7° C., 34.6° C., 34.5° C., 34.4° C., 34.3° C., 34.2° C., 34.1° C., 34.0° C., 33.9° C., 33.8° C., 33.7° C., 33.6° C., 33.5° C., 33.4° C., 33.3° C., 33.2° C., 33.1° C., 33.0° C., 32.9° C., 32.8° C., 32.7° C., 32.6° C., 32.5° C., 32.4° C., 32.3° C., 32.2° C., 32.1° C., or 32.0° C. In certain embodiments, the eutectic mixture containing the EPG and the digestible fat exhibits a melting point of at least 30° C., such as, for example, at least about, or at least, 34.0° C., 33.9° C., 33.8° C., 33.7° C., 33.6° C., 33.5° C., 33.4° C., 33.3° C., 33.2° C., 33.1° C., 33.0° C., 32.9° C., 32.8° C., 32.7° C., 32.6° C., 32.5° C., 32.4° C., 32.3° C., 32.2° C., 32.1° C., or 32.0° C., 31.9° C., 31.8° C., 31.7° C., 31.6° C., 31.5° C., 31.4° C., 31.3° C., 31.2° C., 31.1° C., 31.0° C., 30.9° C., 30.8° C., 30.7° C., 30.6° C., 30.5° C., 30.4° C., 30.3° C., 30.2° C., 30.1° C., or 30.0° C.

In certain embodiments, the eutectic mixture has a Mettler drop point temperature that is at least about, or at least 0.5° C., 1° C., 1.5° C., 2° C., 2.5° C., 3° C., 3.5° C. or 4° C., 4.5° C., 5° C., 5.5° C. or 6° C. lower that the Mettler drop point temperature of one or more digestible fats that are included in the eutectic mixture, or any combination of digestible fats that are included in the eutectic mixture.

The eutectic fat compositions may be used in food products, such as a chocolate and chocolate-flavored product, snack bar, candy, topping, filling, baking chip, cookie, cracker, sweet good, snack cake, pie, granola bar, toaster pastry, potato chip, corn chip, tortilla chip, extruded snack, popcorn, pretzel, potato crisp, nut spread, dip, spread, dried fruit, meat snack, pork rind, rice cake, corn cake, dried vegetable, brownie, filled cracker, filled extruded snack, enrobed extruded snack, cheese ball, cheese curl, cheese crunch, cheese stick, onion ring, pizza chip, potato chip, potato skin, potato stick, veggie stick, pretzel, a nougat, malted milk balls, aerated milk chocolate, or puffed snack. In certain embodiments, eutectic mixtures of EPGs and digestible fats are formulated to simulate the sharp melting profile of cocoa butter making them suitable as a low calorie cocoa butter substitute in confectionery formulations including dark and milk chocolates, chocolate candies, snack bars, toppings, fillings, baking chips and other applications in which cocoa butter is used.

The term "chocolate" is intended to refer to all chocolate or chocolate-like compositions that contain at least one cocoa or cocoa-like component. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, non-standardized chocolates, compound chocolate and chocolate-like compositions, unless specifically identified otherwise. Furthermore, while many different countries specifically define food products containing cocoa or cocoa products as having certain ranges or ingredients, the terms chocolate, milk chocolate, and dark chocolate as used herein, do not imply, unless stated otherwise, a specific content.

Compound chocolate is a less expensive chocolate-like product and contains fats other than cocoa butter and milk or dairy fats. It is generally composed of cocoa, vegetable fat and sweeteners, with optional additives such as milk, milk fats, dairy fats, emulsifiers, flavors and colors. Compound chocolate may contain some cocoa butter which can come, for example, from partially defatted cocoa powder or from cocoa liquor, some milk fat or a combination thereof, or may be substantially free of cocoa butter, milk fat or a combination thereof. For example, compound chocolate can contain vegetable fats that are hard, solid or semi-solid at room temperature, such as coconut oil, palm oil and palm kernel oil, including fractioned palm kernel oil. Palm kernel oil, palm oil, babassu oil and coconut oils in hydrogenated, randomized or fractionated states can be used. When used in candy coating, compound chocolate may be referred to as "compound coating." Compound coatings and compound chocolate have the additional benefit of not requiring tempering steps that may be required when using chocolate that has all, or substantially all, of its fat being cocoa butter or a combination of dairy fat and cocoa butter.

Compound chocolate can be used in milk chocolate, candy bars, coated candies, doughnut and pastry coatings, baked goods coatings, soft fillings and a variety of other applications. Compound chocolate is a lower cost alternative to real chocolate, and typically has a comparable caloric content. Replacing all or part of vegetable fat in compound chocolate with EPG reduces caloric value while preserving other product attributes including taste, mouthfeel, melting profile, surface sheen, resistance to bloom, snap and shelf life.

As with cocoa butter, solid EPG forms eutectic mixtures with solid or semi-solid vegetable fats resulting in reduced melting point of fat blends. Eutectic properties allow solid EPG with melting points above human body temperature to be consumed in a blend with vegetable oil without the negative mouthfeel effects, like "waxy" residue in the mouth while preventing negative gastrointestinal problems such as "oil leakage".

When EPGs as described herein are mixed with a vegetable fat, such as fractionated palm kernel oil, a large eutectic effect may be observed, which, without wishing to be bound by any theory, may be based on the dissimilarity in fatty acids between the EPG and the vegetable oil. For example, fractionated palm kernel oil contains about 80% of fatty acids in the C8:0 to C14:0 range, which fatty acids are generally not present in EPG or cocoa butter.

Eutectic EPG vegetable fat mixtures, such as those used in compound chocolate, retain a sharp melting profile useful in confectionery product applications. The sharp melting profile may include a transition from solid to liquid over a temperature range of less than about 5° C., less than about 4.5° C., less than about 4° C., less than about 3.5° C., less than about 3° C., less than about 2.5° C., or less than about 2° C. Accordingly the eutectic mixtures can be used in confectionery and baked product applications, including as coatings, moulds, dipping applications, and fillings.

Chocolate may take the form of solid pieces of chocolate, such as bars or novelty shapes, and may also be incorporated as an ingredient of other, more complex, confections where chocolate is combined with or used to coat other foods such as caramel, peanut butter, nougat, fruit pieces, nuts, wafers, cookies, cakes, ice cream, pastries or the like.

Since eutectic properties are the result of fat blends forming different crystal structures than their components, it is possible to influence crystallization of the blends and consequently their melting points by incorporating small amounts of fat crystal initiators or fat crystal stabilizers. A typical example of crystal initiator in food products is peanut butter stabilizer, such as a stearine, such as 27 Stearine™. Suitable stabilizers include high melting point fats composed of saturated fatty acids, predominantly stearic and palmitic acids or high melting point mono- and di-glycerides. The stabilizer, such as Stearine 27, can induce crystal matrix formation of solid fat, for example, within the body of peanut butter, which entraps small droplets of liquid oil thus preventing its separation. Typically the addition of a fat crystal initiator will result in a higher melting temperature of the fat or fat blend in which it is included.

The methods and formulations described herein may eliminate or substantially eliminate the need for a second synthetic fat in the form of a liquid partially digestible fat to make the EPG more palatable through lowering its melting point. In certain embodiments, the food products containing the eutectic mixtures of EPG and digestible fat are free of, essentially free of, or substantially free of one or more partially digestible fats which have a solid fat index or a solid fat content of less than about 50 at 21° C. A "partially digestible fat", as used herein, is a fat having a caloric content of from 3 to 7 kilocalories per gram. Partially digestible fats may include, for example, EPGs, sucrose esters and polyesters and fatty acid sucrose esters and polyesters, esterified epoxide-extended polyols, polyalcohol esters (such as sorbestrin), polyglycerol esters and other synthetic fat-like compounds. The food products may be free or substantially free of partially digestible fats which have a solid fat index or a solid fat content of less than about, or less than, 60, 55, 50, 45, 40, 35, 30, 25, or 20 at 21° C. The food products may be free of, essentially free of, or substantially free of one or more partially digestible fats which have a melting temperature of less than about, or less than, 37.0° C., 36.9° C., 36.8° C., 36.7° C., 36.6° C., 36.5° C., 36.4° C., 36.3° C., 36.2° C., 36.1° C., 36.0° C., 35.9° C., 35.8° C., 35.7° C., 35.6° C., 35.5° C., 35.4° C., 35.3° C., 35.2° C., 35.1° C., 35.0° C., 34.9° C., 34.8° C., 34.7° C., 34.6° C., 34.5° C., 34.4° C., 34.3° C., 34.2° C., 34.1° C., 34.0° C., 33.9° C., 33.8° C., 33.7° C., 33.6° C., 33.5° C., 33.4° C., 33.3° C., 33.2° C., 33.1° C., 33.0° C., 32.9° C., 32.8° C., 32.7° C., 32.6° C., 32.5° C., 32.4° C., 32.3° C., 32.2° C., 32.1° C., 32.0° C., 31.9° C., 31.8° C., 31.7° C., 31.6° C., 31.5° C., 31.4° C., 31.3° C., 31.2° C., 31.1° C., 31.0° C., 30.9° C., 30.8° C., 30.7° C., 30.6° C., 30.5° C., 30.4° C., 30.3° C., 30.2° C., 30.1° C., 30.0° C., 29.5° C., 29.0° C., 28.5° C., 28.0° C., 27.5° C., 27.0° C., 26.5° C., 26.0° C., 25.5° C., or 25.0° C.

The amount of EPG and digestible fat present suitable for use in the food product may vary, and the relative proportions of EPG and digestible fat can be manipulated to tailor the melting point of the mixture so that is suitable for a particular food product application. In certain embodiments, the amount of digestible fat present, by weight, is equal to or less than the amount of EPG present by weight to minimize caloric contribution. Compositions and food products may have a ratio of EPG:digestible fat by weight of from about 95:5 to about 50:50, about 90:10 to about 50:50, about 85:15 to about 50:50, about 80:20 to about 50:50, 75:25 to about 50:50, about 70:30 to about 50:50, about 95:5 to about 60:40, about 90:10 to about 60:40, about 85:15 to about 60:40, about 80:20 to about 60:40, about 75:25 to about 60:40, about 70:30 to about 60:40, about 95:5 to about 70:30, about 90:10 to about 70:30, about 85:15 to about 70:30, about 80:20 to about 70:30, about 75:25 to about 70:30, about 95:5 to about 75:25, about 90:10 to about 75:25, about 85:15 to about 75:25, about 80:20 to about 75:25, about 95:5 to about 80:20, about 90:10 to about 80:20, about 85:15 to about 80:20, about 95:5 to about 80:15, 90:10 to about 80:15 or about 95:5 to about 90:10.

Compositions and food products may have a ratio of EPG:digestible fat by weight of from about 95:5 to about 5:95, about 95:5 to about 10:90, about 95:5 to about 15:85, about 95:5 to about 20:80, about 95:5 to about 25:75, about 95:5 to about 30:70, about 95:5 to about 40:60, about 90:10 to about 5:95, about 90:10 to about 10:90, about 90:10 to about 15:85, about 90:10 to about 20:80, about 90:10 to about 25:75, about 90:10 to about 30:70, about 90:10 to about 40:60, about 85:15 to about 5:95, about 85:15 to about 10:90, about 85:15 to about 15:85, about 85:15 to about 20:80, about 85:15 to about 25:75, about 85:15 to about 30:70, about 85:15 to about 40:60, about 80:20 to about 5:95, about 80:20 to about 10:90, about 80:20 to about 15:85, about 80:20 to about 20:80, about 80:20 to about 25:75, about 80:20 to about 30:70, about 80:20 to about 40:60, about 75:25 to about 5:95, about 75:25 to about 10:90, about 75:25 to about 15:85, about 75:25 to about 20:80, about 75:25 to about 25:75, about 75:25 to about 30:70, about 75:25 to about 40:60, about 70:30 to about 5:95, about 70:30 to about 10:90, about 70:30 to about 15:85, about 70:30 to about 20:80, about 70:30 to about 25:75, about 70:30 to about 30:70, about 70:30 to about 40:60, about 60:40 to about 5:95, about 60:40 to about 10:90, about 60:40 to about 15:85, about 60:40 to about 20:80, about 60:40 to about 25:75, about 60:40 to about 30:70, about 60:40 to about 40:60. The present disclosure further provides methods of formulating a food product in which a digestible fat and an esterified propoxylated glycerol having a solid fat index (or solid fat content) disclosed herein are added to, combined, mixed or blended with at least one food component in amounts sufficient to form a eutectic mixture having a melting temperature below about 37° C., 36.5° C., 36° C., 35.5° C., 35° C., 34.5° C., 34° C., 33.5° C., 33° C., 32.5° C., or 32° C., thereby formulating the food product. The digestible fat and the EPG may be combined to form a eutectic mixture prior to being added to, combined, mixed or blended with one or more other the food product components, or the EPG and digestible fat may be added separately to one or more other components of the food product, and the eutectic mixture formed from the digestible fat and the EPG in situ with the other food product component(s).

The present disclosure further provides methods of reducing the waxiness of edible products measured at 30, 31, 32, 33, 34, 35, 36, or 36.5° C. compared with the edible product containing the EPG but not containing the eutectic mixture. The method includes adding a digestible fat to an edible product containing an esterified propoxylated glycerol having a solid fat index of at least about 60 at 20° C. (or as described in paragraph 6) in an amount sufficient to form a eutectic mixture of digestible fat and EPG, the eutectic mixture having a melting temperature below about 37, 36.5, 36, 35.5, 35, 34.5. 34. 33.5. 33, 32.5 or 32° C.

It will be apparent to those of skill in the art that variations may be applied to the compositions and methods described herein and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention.

It is to be understood that the invention is not limited in its application to the details of construction and the arrangement of components set forth in the following description. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The following non-limiting examples are purely illustrative.

Example 1

Preparation of EPGs Having Melting Temperatures of about 38-39° C.

Table 1 below shows propoxylation level, i.e., the number of propoxylate units per molecule of glycerol (for example, EPG-03 means 3 propoxylate units per glycerol) and corresponding fatty acids esterified with propoxylated glycerol that will achieve an EPG melting point of 38-39° C.

TABLE 1

Required Propoxylation Level and Approximate Fatty Acid Composition for EPGs melting at 38-39° C.

| | EPG-03 | EPG-05 | EPG-08 |
|---|---|---|---|
| EPG Melting point, ° C. | 38-39 | 38-39 | 38-39 |
| Fatty acid composition, % | | | |
| Lauric, C12:0 | 30 | | |
| Miristic, C14:0 | 12 | | |
| Palmitic, C16:0 | 7 | 10 | 5 |
| Stearic, C18:0 | 50 | 59 | 44 |
| Arachidic, C20:0 | 1 | 2 | 1 |
| Behenic, C22:0 | | 28 | 50 |
| Total FAC, % | 100 | 100 | 100 |
| Examples of fatty acid proportions (%) from specific oils as required for different EPGs | | | |
| Hydrogenated palm oil FA | 65 | | |
| Hydrogenated soybean oil FA | | 15 | |
| Hydrogenated high erucic acid rapeseed oil FA | | 85 | 85 |
| Distilled behenic acid, C22:0 | | | 15 |

Example 2

Eutectic Properties of EPG Combined with Digestible Fat

DSC (Differential Scanning calorimetry) curves were performed for 2 different samples of EPG, cocoa butter, and fractionated palm kernel oil, as well as their blends. The results are shown in FIGS. 1, 2, 3, 4 and 5. DSC analysis provides measurement of the heat required to melt fat crystals as a small sample is heated from low (5° C.) to high (60° C.) temperature. FIGS. 1 to 5 show EPG blends exhibit eutectic properties, having lower melting points than either component of the mixture.

Example 3

Figure 6:
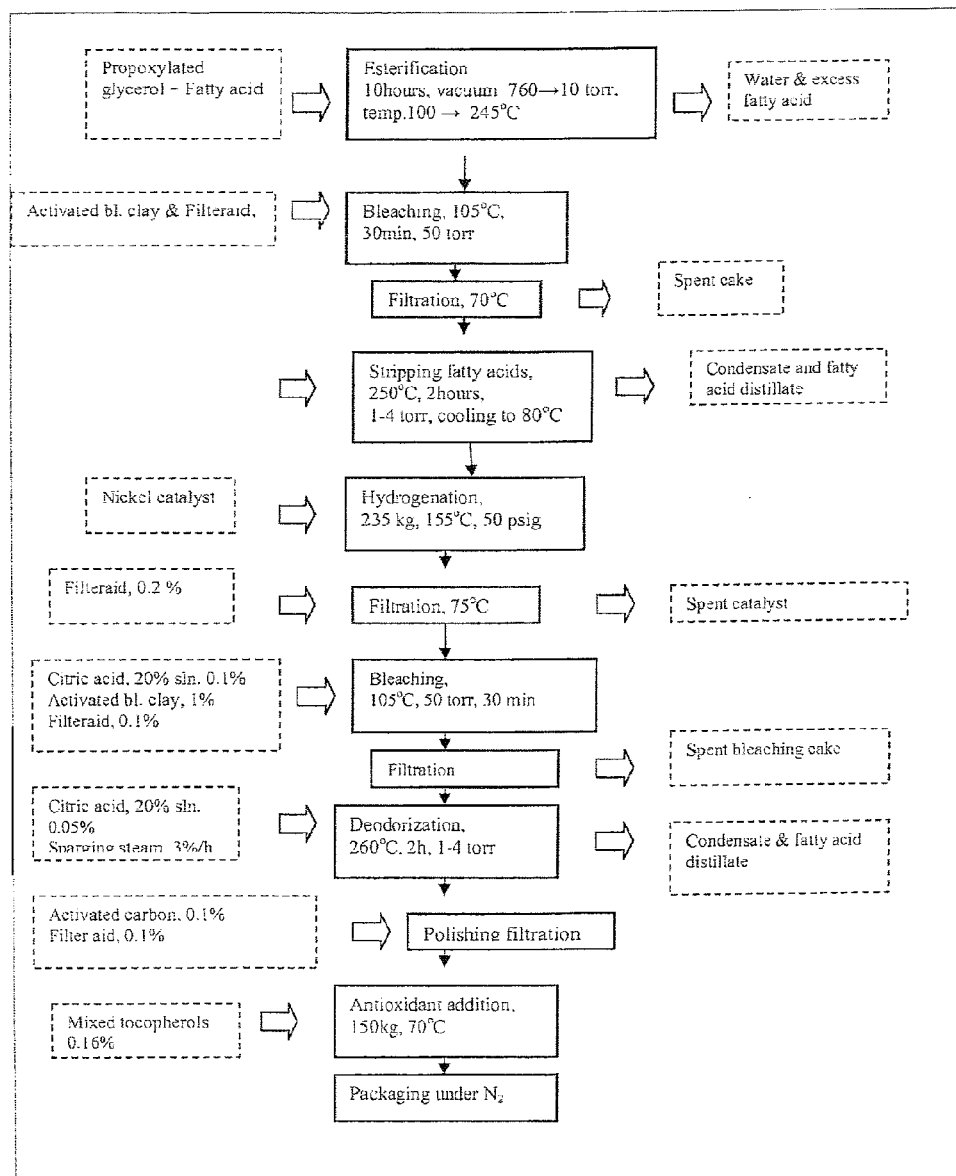
FIG. 6 is a chart showing a pilot plant scale esterification for the production of an esterified propoxylated glycerol, such as EPG-05 with a melting point of 38-39° C.

Esterification of Propoxylated Glycerol (PG-05) with Fatty Acids and Processing of EPG The flow chart shown in FIG. 6 represents a pilot plant scale production of EPG-05 with melting point of 38-39° C.

The esterification of propoxylated glycerol with fatty acids is performed under vacuum in a heated, stainless steel reactor equipped with an agitator. The esterification reaction is controlled by a gradual increase of temperature (from 100° to 245° C.) during the first 4 hour period with simultaneous vacuum increase (from 760 torr to below 10 torr) to remove water (a reaction by-product). Under these parameters about 90% esterification of available hydroxyl groups on propoxylated glycerol (PG-05) is completed during the first 4-5 hours, while the additional conversion (96-99%) is achieved by extending the reaction time to about 9-11 hours. The excess of fatty acids used vs. stoichiometric amount is about 20%.

Once the esterification reaction is complete (96% conversion), crude EPG obtained is cooled and bleached at 105° C. with 2% activated bleaching clay and 0.2% filteraid under vacuum for about 30 min. Then, the mixture is cooled to 70° C. and filtered. Next, the bleached crude EPG is stripped of excess fatty acids in the deodorizer (250° C., 2 hours, 3% sparging steam/h, 1-4 torr vacuum). Finally, the stripped EPG is cooled to about 80° C., the vacuum is broken with nitrogen, and the product transferred to a hydrogenation reactor.

Hydrogenation of EPG proceeds under conditions typically employed for vegetable oils with a Ni-catalyst, at 155-165° C. and $H_2$ pressure of 30-50 psig. Since the objective is to fully saturate fatty acids (IV<2), selectivity is not important. Reaction time is expected to range from 3-5 hours and is determined by refractive index readings and iodine value analyses. Once the desired end-point is achieved, the reactor is cooled to 75° C., purged with nitrogen and the product filtered.

The hydrogenated and filtered EPG is then transferred to a vacuum bleacher and pretreated with 0.1% citric acid (20% solution) at 75° C. for 15 minutes. Then, 1% activated bleaching clay and 0.1% filter-aid are added, the temperature is raised to 105° C. and the suspension mixed under vacuum for 30 minutes. Afterwards, the mixture is cooled to 70° C., the vacuum broken with nitrogen, and suspended solids are filtered off.

Batch deodorization of bleached EPG follows under typical conditions employed for vegetable oils (250° C., 2 hours, 3% sparging steam, vacuum). Citric acid, 0.1% of 20% solution, is added to EPG prior to deodorization. The deodorized EPG is cooled, from 250° to 150° C. while maintaining sparging steam flow, then to 60° C. with nitrogen sparge, and filtered through a polishing filter precoated with 0.1% DARCO KB™ (powdered activated carbon) and 0.1% filteraid. Bland flavor and FFA<0.1% are indicative of well deodorized product.

The deodorized, polished, $N_2$ saturated EPG is transferred to a nitrogen blanketed, agitated tank and fortified with 0.15% COVI-OX T-70™, containing vegetable mixed tocopherols. After mixing for 15 minutes to well disperse the antioxidant, EPG is poured into clean, containers. The sealed containers are allowed to cool overnight to ambient temperature, then are transferred to a refrigerator for storage prior to shipping.

Example 4

A dark chocolate product is prepared on the bench from the following ingredients shown in Table 2:

TABLE 2

| Ingredient | Amount (grams) |
| --- | --- |
| Chocolate liquor (53% cocoa butter) | 317.50 |
| EPG (MP 38° C.) produced in Example 3 | 192.50 |
| Sucrose powder (extra fine) | 486.60 |
| Vanilla flavor | 0.30 |
| Lecithin | 3.10 |
| Total | 1000.00 |

Sucrose powder, chocolate liquor, melted EPG, vanilla flavor and lecithin are mixed at 60° C. in a heated Hobart bowl until the mass becomes fluid. Next, the mass is refined in a 3-roll mill to achieve particle size of 25-30 microns. The chocolate mass is then re-melted in the heated Hobart bowl and conched at 70° C. for 2 hours to achieve the desired flavor and consistency. Further, the mass obtained is tempered in a table-top temperer by cooling to 27° C. and holding at this temperature until crystallization becomes evident. Then, the mass is warmed to 35° C. and held at this temperature for 3 minutes to melt the early-forming fat crystals. Subsequently, the temperature is lowered to 30° C. and the mass held for 2 minutes. Then, the mass is warmed again to 33° C. and poured into moulds which are vibrated to release air bubbles. The mass in moulds is then set under an oscillating fan in a temperature controlled room maintained at 15-16° C. until hardened. Formed and hardened chocolate is released from moulds, packaged and stored in dry space at 20-25° C. The product obtained exhibits surface sheen, snap, hardness, mouthfeel and taste comparable to standard dark chocolate made with cocoa butter. The ratio of EPG to cocoa butter in this example is 53:47 and the melting point of the fat blend is reduced to about 35° C. due to eutectic effect. Additionally, the chocolate product obtained has 30% fewer calories, has digestible fat reduced by 47%, and calories from fat reduced by 52% compared to standard dark chocolate.

Example 5

A milk chocolate product is prepared on the bench using the following ingredients shown in Table 3:

TABLE 3

| Ingredient | Amount (grams) |
| --- | --- |
| Chocolate liquor (53% cocoa butter) | 16.00 |
| Skim milk powder | 154.80 |
| Sucrose powder (extra fine) | 380.00 |
| EPG (MP 38° C.) produced in Example 3 | 324.00 |
| Coca powder (11% Cocoa Butter) | 119.40 |
| Lecithin | 4.50 |
| Salt | 1.00 |
| Vanilla flavor | 0.30 |
| Total | 1000.00 |

In a jacketed Hobart bowl cocoa powder, sugar powder, skim milk powder, salt and vanillin are mixed to form a uniform blend. Chocolate liquor and melted EPG are added to the powdered blend while maintaining a temperature of 60° C. Then, the lecithin is added and the entire content of the bowl mixed thoroughly until the mass becomes fluid. The mass obtained is passed through a 3-roll refiner to reduce its particle size to about 25 microns. Next, the refined mass is re-melted in a jacketed bowl at 70° C. and mixed well until smooth and fluid, exhibiting viscosity of 150 dynes/cm$^2$ at 48.9° C. The mass is then poured into moulds which are vibrated to release entrapped air bubbles. The product in moulds is set under circulating air in a temperature controlled room maintained at 15-16° C. until firm and hardened. Next the product is de-molded, wrapped and stored in dry space at 20-25° C. The milk chocolate product obtained exhibits surface sheen, snap, hardness, mouthfeel and taste typical for standard milk chocolate made with cocoa butter. The ratio of EPG to cocoa butter is about 83:17 and the melting point of the fat blend is below human body temperature thus eliminating waxy mouthfeel. The product has 50% fewer total calories, 82% lower digestible fat content and 79% fewer calories from fat compared to typical milk chocolate made with cocoa butter.

Example 6

A peanut butter spread is prepared on the bench using the ingredients below shown in Table 4:

TABLE 4

| Ingredient | Amount (grams) |
|---|---|
| Peanut slurry (53% fat) | 1070.00 |
| Defatted peanut flour (12% fat) | 500.00 |
| EPG (MP 38° C.) produced in Example 3 | 360.00 |
| Sucrose | 50.00 |
| Salt | 20.00 |
| Total | 2000.00 |

Melted EPG (65° C.) is mixed with defatted peanut flour in a stainless steel bowl, and then the mixture is passed through a laboratory Glen mill followed by a roller mill. The milled mixture is transferred into a 3000 ml Pyrex glass reaction vessel equipped with cover, stirrer and heating mantle. The mixture is heated at 170° C. and mixed until the desired brown color develops. Then, the mass is transferred from the glass vessel to a stainless steel container which is placed in an ice water bath to cool the mass to 38° C. Peanut slurry, salt and sugar are added to the container and mixed well using a scrape wall mixer with Teflon blades. Next, the mixture is passed through the roller mill and the product transferred into a glass vessel where it is heated to 70° C. with constant mixing. Vacuum is drawn on the vessel and mixing of fluid mass continues until no air bubbles are visible. Then, the product is cooled to 38° C. and poured into jars. The peanut butter spread obtained exhibits good peanut flavor, smooth texture and shows no signs of oil separation because EPG also functions as a stabilizer, preventing phase separation. The product has 26% fewer calories and 32% lower fat content compared to standard peanut butter. The ratio of EPG to peanut oil is 34:66.

Example 7

Margarine (stick variety) is made in the pilot plant using the ingredients listed below in Table 5:

TABLE 5

| Ingredient | Amount (% in finished product) |
|---|---|
| Aqueous phase: | |
| Water, pasteurized | 16.1569 |
| Whey powder, M | 1.5979 |
| Salt | 1.8000 |
| Margarine flavor, M-312 | 0.0375 |
| Calcium disodium EDTA | 0.0077 |
| Total | 19.6000 |
| Oil phase: | |
| Corn oil | 53.6428 |
| EPG (MP 38° C.) produced in Example 3 | 25.0000 |
| Peanut butter stabilizer | 1.0000 |
| Mono-glycerides | 0.5000 |
| Lecithin | 0.2400 |
| Vitamin premix M, orange | 0.0047 |
| Margarine flavor M-325 | 0.0125 |
| Total | 80.4000 |

Whey powder is dissolved in water and pasteurized at 74° C. for 20 seconds in a jacketed tank. Then the water/whey solution is cooled to 27° C. and salt, margarine flavor and EDTA are added under continuous agitation.

To a separate, jacketed emulsion tank, the required volumes of corn oil and solid EPG are added. The oil/EPG mixture is heated to 65° C. with constant agitation. Then, the required mono-glycerides, lecithin vitamins and stabilizer are mixed in a small amount of warm oil/EPG blend and returned to the emulsion tank. All the oil phase ingredients in the emulsion tank are mixed for 10 minutes.

The aqueous phase is added to the oil phase in the emulsion tank at the rate of 3-4 kg/min with shear agitator on. After the entire aqueous phase is added, shear mixing continues for 10 minutes. Then, votators are turned on and speed adjusted to 750 rpm. Next, the emulsion is pumped through the votators maintained at 18° C. The finished margarine is packed into 8 oz plastic tubs. This product is particularly suitable for frying and baking and exhibits 30% caloric reduction and 29% fat reduction compared to the non-EPG control margarine. The ratio of EPG to digestible fat is about 31:69.

Example 8

Baked brownie dessert is prepared using the following ingredients shown in Table 6:

TABLE 6

| Ingredient | Amount (grams) | % |
|---|---|---|
| Baking Chocolate (48% cocoa butter) | 250 | 13.61 |
| EPG (MP 38° C.) prepared in Example 3 | 275 | 14.97 |
| Whole eggs | 300 | 16.33 |
| Sugar | 600 | 32.66 |
| Vanilla extract | 15 | 0.82 |
| Flour | 165 | 8.98 |
| Salt | 6 | 0.33 |
| Chopped pecans | 226 | 12.30 |
| Total | 1837 | 100.00 |

Chocolate and EPG are melted in a saucepan over low heat. Eggs, sugar and vanilla are blended with a kitchen mixer at high speed for 10 minutes. Flour and salt are slowly blended into the chocolate/EPG mixture. Then, pecans are stirred in and the mass poured into a 9"×13" baking pan. The brownie is baked for 35-40 minutes at 190° C. This brownie has overall 23% fewer calories, fat reduced by 59% and 41% fewer calories from fat compared to brownie made without EPG. The proportion of EPG to cocoa butter in this product is 70:30.

Example 9

A blend of 60% EPG (produced in Example 3) and 40% soybean oil (Wesson brand) is used to fry potato chips on the bench in multiple frying. Fresh Idaho potatoes are peeled on the day prior to frying and stored under water overnight in a refrigerator. On the day of frying, a bench fryer is filled with 2000 g of melted EPG and soybean oil blend, and its temperature raised to 187° C. Next, 150 grams of 1.2 mm thick potato slices are dipped in a frying basket into the hot oil. The chips are fried for 3-4 minutes until bubbling on the surface of the oil has almost completely stopped. Then, the basked is removed from the oil and allowed to hang over the fryer for 1 minute to drain. Next, the chips are spread on paper towels and cooled to ambient temperature. The weight of the fryer is checked and fresh EPG/soybean oil blend is added to make up for oil loss. The next batch of chips is fried when the oil temperature reaches 187° C. Twenty batches of chips were fried daily and the experiment continued for 6 days. Simultaneously, control samples of chips were fried in 100% soybean oil using the identical procedure.

Analysis of the potato chips (appearance, taste, crispiness, moisture and oil content) indicates comparable products from both frying mediums. Also, the blend of EPG/soybean oil showed similar changes during extended frying to the control soybean oil (FFA increase, volatile compounds formation, polymerization, color development). Per 28 g serving, potato chips fried in EPG/soybean oil blend (ratio 60:40) have 59% fewer calories from fat and 31% fewer calories overall compared to chips fried in soybean oil.

Example 10

French fries are prepared in a bench fryer containing 2000 g of oil blend consisting of 65% EPG (produced in Example 3) and 35% soybean oil (Wesson). Two hundred and fifty grams of freshly cut and washed fries are placed in a frying basked and submerged in hot, 190° C. oil blend for 7 minutes. Then the basket is raised, shaken to remove excess oil and hung on the side of the fryer for 1.5 minutes to drain more oil. Next the basket with fries is placed on a paper plate and allowed to drain for an additional 1.5 minutes. The French fries obtained exhibit typical quality (taste, appearance) but their overall caloric content is reduced by 31%.

Example 11

Propoxylated glycerol (PG-03) is esterified with fatty acids and processed under conditions specified in Example 3. A blend of distilled myristic, palmitic and stearic acids, simulating fatty acid composition of fully hydrogenated palm oil, is used in order to achieve finished EPG-03 with the following properties shown in Table 7:

TABLE 7

| | |
|---|---|
| Melting point (Mettler dropping point), ° C. | 38 |
| Fatty Acid Composition, % (as oleic) | |
| Lauric, C12:0 | 30 |
| Myristic, C14:0 | 12 |
| Palmitic, C16:0 | 7 |
| Stearic, C18:0 | 50 |
| Arachidic, C20:0 | 1 |
| Iodine Value | <1 |
| Mixed Tocopherols, ppm | 1100 |

Since propoxylation "03" denotes an average number of a Gaussian distribution curve, some primary hydroxyl groups of glycerol remain available for direct esterification with fatty acids which are subsequently hydrolyzed by lipases. Consequently EPG-03 exhibits a slightly higher caloric value compared to more highly propoxylated compounds. It is estimated that EPG-03 in this example provides about 1.5 to 2 kcal/g upon digestion.

Example 12

Chocolate Syrup Brownies are prepared according to the following recipe shown in Table 8:

TABLE 8

| Ingredient | Amount (grams) |
|---|---|
| Brownie batter | |
| EPG-03 (MP 38° C.) prepared in Example 11 | 95 |
| White sugar | 200 |
| Four large eggs | 245 |
| Chocolate syrup, Hershey's Special Dark Syrup ™ | 500 |
| Flour, all-purpose | 140 |
| Vanilla extract | 5 |
| Chopped walnuts | 60 |
| Brownie topping: | |
| EPG-03 (MP 38° C.) prepared in Example 11 | 45 |
| Evaporated milk, Carnation ™ | 80 |
| White sugar | 300 |
| Baking chocolate, unsweetened (48% cocoa butter) | 85 |
| Chopped walnuts | 60 |
| Total | 1815 |

Brownie batter is prepared in a bowl by mixing melted EPG-03 (60° C.), white sugar, eggs, chocolate syrup, flour, vanilla extract and chopped walnuts using a kitchen mixer at medium speed. The batter is spread in a 15×12 inch pan and baked in the oven at 175° C. for 25-30 minutes.

Brownie topping is made in a heavy saucepan. Melted EPG-03, sugar and evaporated milk are mixed and brought to boil for 30 seconds. Next, the pan is removed from heat and baking chocolate (chips or small pieces) is added, melted and the mass beaten until thickened. Chocolate topping obtained is poured over baked brownie in the pan while still warm. Chopped walnuts are sprinkled on top and brownie let cool to ambient temperature. Compared to the original recipe containing butter, the EPG-03 brownie has overall calories reduced by 49.7%, fat reduced by 38.5% and calories from fat reduced by 37.4%. The proportion of EPG-03 to cocoa butter in the topping is 70:30.

Example 13

Propoxylated glycerol (PG-08) is esterified with fatty acids and processed under conditions described in Example 3.

Fully hydrogenated high erucic acid rapeseed oil fatty acids (approximately 85%) are enriched with fractionated behenic acid (approximately 15%) to increase the content of behenic acid (C22:0) to 50% in order to achieve finished EPG-08 with the following characteristics shown in Table 9:

TABLE 9

| | |
|---|---|
| Melting Point (Mettler dropping point), ° C. | 38 |
| Fatty Acid Composition, % (as oleic): | |
| Palmitic, C16:0 | 5 |
| Stearic, C18:0 | 44 |
| Arachidic, C20:0 | 1 |
| Behenic, C22:0 | 50 |
| Iodine Value | <1 |
| Mixed Tocopherols, ppm | 1100 |

EPG-08 with properties shown above is practically non-digestible and provides no more than 0.5 kcal/g.

Example 14

Chocolate Mocha Cake is made using the following ingredients shown in Table 10:

TABLE 10

| Ingredient | Amount (grams) |
|---|---|
| All purpose flour | 250 |
| White sugar | 400 |
| Unsweetened cocoa powder | 55 |
| EPG-08 (MP 38° C.) from Example 13 | 120 |
| Two eggs | 120 |
| Buttermilk | 235 |
| Baking soda | 9 |
| Salt | 3 |
| Baking powder | 5 |
| Instant coffee powder | 3 |
| Hot water | 235 |

Flour, sugar, cocoa, melted EPG-08, eggs, buttermilk, baking powder, baking soda and salt are mixed in a mixing bowl. Coffee is dissolved in hot water and added to mixing bowl. The batter is mixed with a kitchen blender at medium speed for 2 minutes. Smooth batter is poured into two 9-inch round, greased cake pans. The cakes are baked at 175° C. for 30-35 minutes, cooled in the pans for 10 minutes, and then turned out onto racks to cool completely. Optionally the cakes can be frosted with coffee icing and decorated with melted semi-sweet chocolate. Compared to standard recipe with vegetable oil, the EPG-08 Chocolate Mocha cake has overall 17% fewer calories, fat reduced by 76% and 74% fewer calories from fat. The proportion of EPG-08 to all residual fats (from cocoa powder, eggs, flour and buttermilk) is 80:20.

Example 15

Dark Chocolate Ice Cream is made using ingredients shown in Table 11 and the procedure described below:

TABLE 11

| Ingredients | Amount (grams) |
|---|---|
| Unsweetened cocoa powder | 60 |
| EPG-08 (from Example 13) | 55 |
| Two eggs | 120 |
| Milk | 230 |
| White sugar | 200 |
| Heavy cream | 230 |

TABLE 11-continued

| Ingredients | Amount (grams) |
|---|---|
| Vanilla extract | 5 |
| Salt | 2 |

EPG-08 is melted in a double boiler over hot water, cocoa powder is added, and gradually milk is whisked in. The ingredients are stirred until smooth, and then the boiler is removed from hot water to cool. In a mixing bowl eggs are whisked until light and fluffy, then sugar is added while continuing whisking for 1 minute until completely blended. Next, the cream, vanilla and salt are whisked in. Finally, the chocolate mass from the boiler is added and all ingredients blended thoroughly, then refrigerated for 1-2 hours. Afterwards, the content of the bowl is transferred to a Cuisinart ICE20™ ice maker. The gel-filled canister of the ice maker is pre-freezed for at least 10 hours prior to making ice cream. One quart of finished chocolate ice cream is obtained. Compared to standard recipe using unsweetened chocolate (48% cocoa butter) the EPG-08 chocolate ice cream has 17% fewer total calories, 26% lower fat content and 31% fewer calories from fat. The ratio of EPG-08 to cocoa butter in this product is 89:11.

Example 16

Experiments were performed to understand and define the properties of EPG in blends with vegetable fats. Samples obtained were characterized by melting properties. Properties of fat blend components used for studying eutectic properties are summarized in Table 12.

An EPG designated EPG-05(B16) was synthesized in the lab by reacting propoxylated glycerol (MW 393.2, hydroxyl value 428) with a blend of distilled palmitic acid (98% purity), stearic acid (93% purity) and behenic acid (90% purity) following process parameters described Examples 2 and 3 and shown in FIG. 6. The simplified lab synthesis process using saturated fatty acids made the hydrogenation step and post-hydrogenation purification steps unnecessary. All distilled fatty acids for EPG-05(B16) were obtained from ACME Hardesty Oleochemicals, Blue Bell, Pa. 19422. Fractionated palm kernel oil sample was received from Blommer Chocolate, Chicago, Ill., 60610. "27 Stearine™" was received from Loders Croklaan, Channahon, Ill. 60410.

TABLE 12

Fatty Acid Composition, Mettler Drop Point and Solid Fat Content of EPG-05 (B16) and Fractionated Palm Kernel Oil (FPKO).

| Attribute | EPG-05(B16) | FPKO |
|---|---|---|
| Fatty Acid Composition, % | | |
| Caprylic, C8:0 | — | 2.0 |
| Capric, C10:0 | — | 2.8 |
| Laurie, C12:0 | — | 54.0 |
| Myristic, C14:0 | 0.1 | 20.9 |
| Palmitic, C16:0 | 9.8 | 8.7 |
| Stearic, C18:0 | 60.0 | 2.0 |
| Oleic, C18:1 | 0.2 | 6.6 |
| Linoleic, C18:2 | 0.2 | 1.1 |
| Linolenic, C18:3 | 0.1 | 1.4 |
| Arachidic, C20:0 | 2.1 | 0.1 |
| Behenic, C22:0 | 26.9 | — |
| Other | 0.6 | 0.4 |
| Total | 100 | 100 |
| Mettler Drop Point, ° C. | 39.1 | 34.2 |

TABLE 12-continued

Fatty Acid Composition, Mettler Drop Point and
Solid Fat Content of EPG-05
(B16) and Fractionated Palm Kernel Oil (FPKO).

| Attribute | EPG-05(B16) | FPKO |
|---|---|---|
| Solid Fat Content (SFC) | | |
| SFC @ 10° C. | 96.1 | 90.3 |
| SFC @ 20° C. | 94.0 | 82.7 |
| SFC @ 25° C. | 90.2 | 68.3 |
| SFC @ 30° C. | 76.5 | 26.1 |
| SFC @ 35° C. | 18.9 | 0.1 |
| SFC @ 40° C. | 0.0 | 0.0 |

Figure 2:
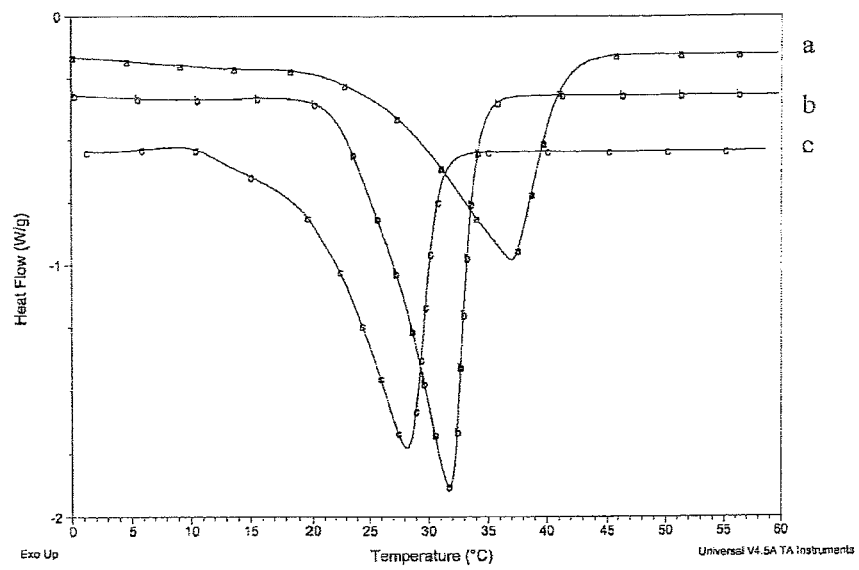
FIG. 2 is a graph showing differential scanning calorimetry (DSC) curves of the melting points of fractioned palm kernel oil (FKPO), an esterified propoxylated glycerol (EPG-05 (B16)), and a blend (50/50) of fractioned palm kernel oil and the esterified propoxylated glycerol.

DSC curves in FIG. 2 show melting profiles of EPG-05 (B16), FPKO and their 50/50 blend. Clearly, the blend exhibits a significant shift in melting profile towards a lower temperature range (curve c). When measured by Mettler drop point method, the 50/50 blend melts at 31.4° C. which is 7.7° C. lower than EPG-05(B16).

Figure 3:
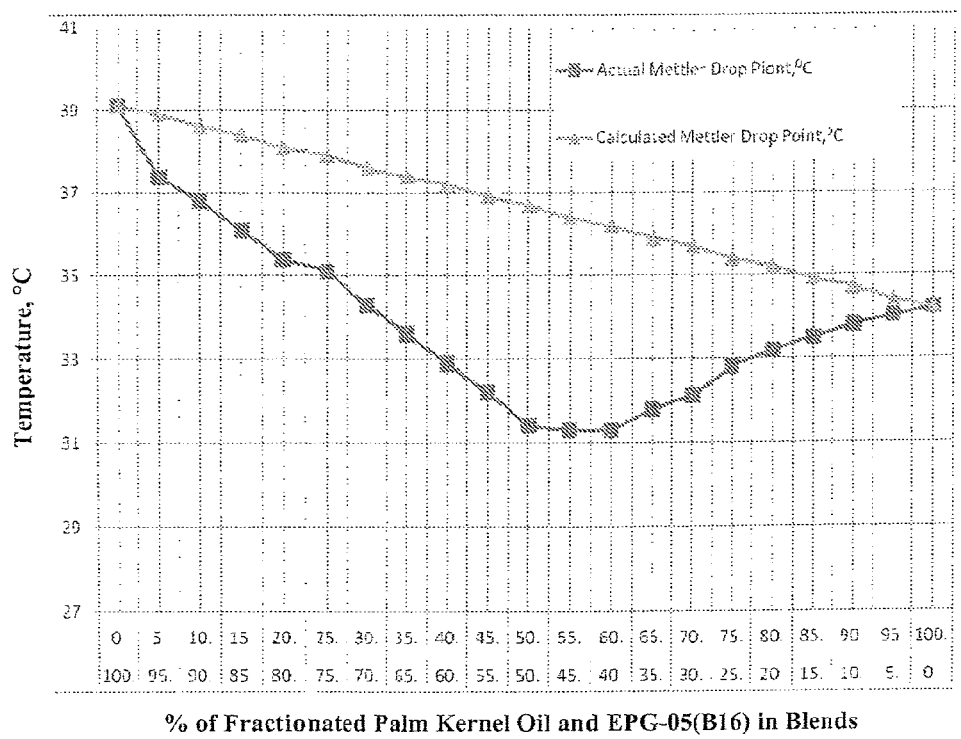
FIG. 3 is a graph showing the Mettler drop points for a number of blends of an esterified propoxylated glycerol and fractioned palm kernel oil.

This unexpected discovery of a large drop in melting temperature of the blend ensures elimination of "waxy" mouth residue while preventing "oil leakage" after FPKO is metabolized in the GI tract leaving nondigestible, solid EPG in the feces. To explore the relationship on how the reduction in melting temperature correlates with proportions of each fat component in the blend, EPG-05(B16) and FPKO blends were prepared in 5% increments and analyzed for Mettler drop point. FIG. 3 shows weighted, calculated melting temperature, and actual melting temperature of the blends. It is evident that even 5% of either component in the blend causes a reduction of melting temperature. The lowest melting temperature was recorded for fat blends containing 50-40% EPG-05(B16) and 50-60% FPKO. These data also reveal that blends containing 75-65% EPG-05(B16) and 25-35% FPKO exhibit melting points similar to 100% FPKO, and thus can be substituted for FPKO in compound chocolate. For blends containing 50-40% EPG, a higher melting temperature EPG would raise the melting temperature of the blend to 33-35° C. region. The melting temperature of EPG can be raised by adjusting its fatty acid composition, e.g., increasing the content of long chain saturated fatty acid. This is just one approach to compensating for eutectic effects depending on the ratio of EPG to natural fats in the blend or in the final product.

Example 17

Figure 4:
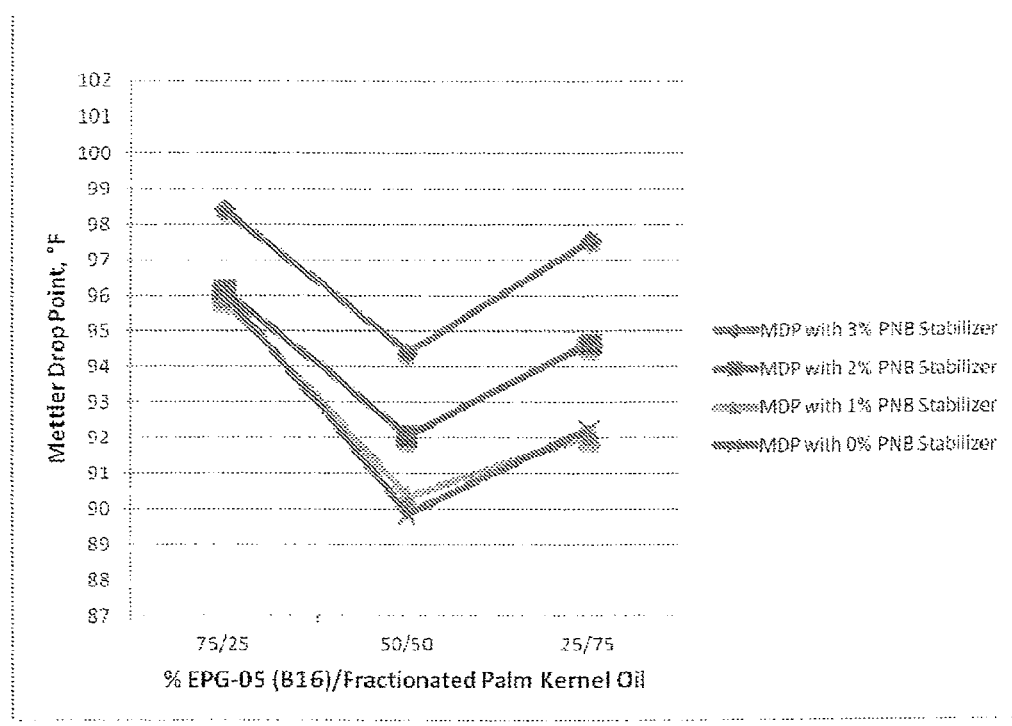
FIG. 4 is a graph showing the Mettler drop points (MDP) for a number of blends of an esterified propoxylated glycerol (EPG-05 (B16)) and fractioned palm kernel oil with a fat crystal stabilizer 27 Stearine™ (Peanut Butter Stabilizer; PNB Stabilizer).

To determine the effect of a fat crystal stabilizer on the melting temperature of EPG eutectic blends, samples representing 75/25, 50/50 and 25/75 EPG-05(B16) and FPKO according to Example 16 were fortified with 1, 2 and 3% "27 Stearine™" from Loders Croklaan. "27 Stearine™" is derived from palm oil and crystallizes in a stable Beta-prime form preventing oil separation in peanut butter over a wide range of storage temperatures and is also used as a melting point adjustor for many processed foods. FIG. 4 shows that "27 Stearine™" improves the melting point of EPG blends, particularly those with higher proportions of FPKO. Consequently, fat crystal stabilizers can be used to increase the melting temperature of EPG eutectic mixtures.

Example 18

Figure 5:
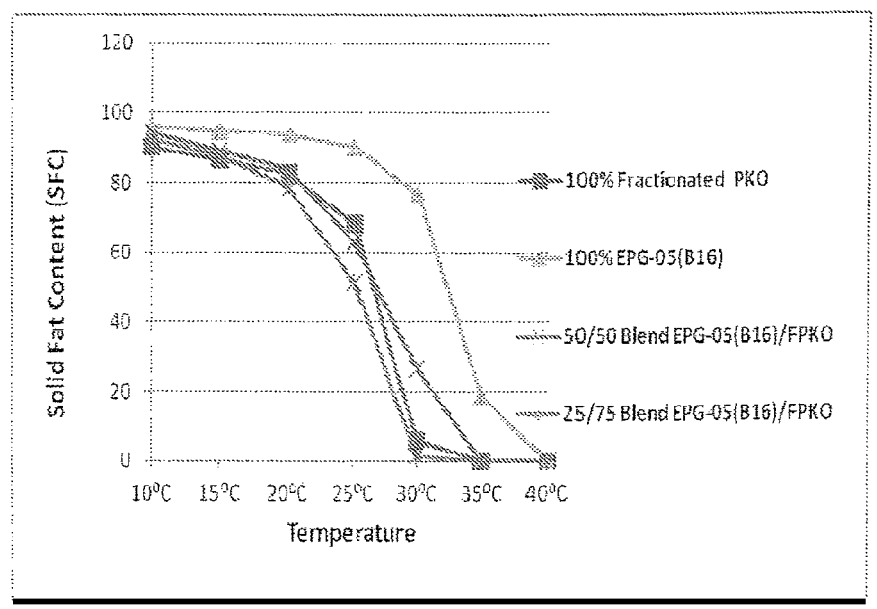
FIG. 5 is graph showing the solid fat content of an esterified propoxylated glycerol (EPG-05 (B16)), fractioned palm kernel oil (FKPO) and blends of esterified propoxylated glycerol and fractioned palm kernel oil.

For application of EPG eutectic mixtures in confectionery products the retention of a steep melting profile as measured by Solid Fat Content (SFC) is desired. EPG-05(B16), FPKO and their 50/50 and 25/75 blends according to Example 16 were tested. FIG. 5 shows SFC for EPG-05(B16), FPKO and their 50/50 and 25/75 blends. All samples exhibited a sharp, desirable SFC profile, but EPG alone had higher solids content throughout while both blends overlapped with FPKO. These results confirm that eutectic EPG blends with solid vegetable fats are viable in confectionery applications and impart desirable "hardness" and "snap" to finished products.

What is claimed is:

1. A method of formulating a food product, the method comprising adding to at least one food component a digestible vegetable fat that is hard, solid or semi-solid at room temperature selected from the group consisting of cocoa butter, palm kernel oil, palm kernel stearine, coconut oil, babassu oil and combinations thereof in natural, fractionated or hydrogenated states and an esterified propoxylated glycerol, the esterified propoxylated glycerol having a solid fat index of at least about 60 at 20° C. and a melting temperature of at least about 38° C., the digestible vegetable fat and esterified propoxylated glycerol being added in amounts sufficient to form a eutectic mixture having a melting temperature of at least about 30° C. and below about 37° C., an actual Mettler drop point temperature that is at least 1° C. lower than the weighted, calculated Mettler drop point temperature of a blend of the digestible vegetable fat and esterified propoxylated glycerol, and a sharp melting profile comprising a transition from solid to liquid over a temperature range of less than about 5° C., thereby formulating the food product, whereby upon ingestion of the food product by a subject the digestible vegetable fat is digested and absorbed and the esterified propoxylated glycerol solidifies in the digestive tract of the subject thereby reducing or preventing passive oil loss.

2. The method of claim 1, wherein the food product comprises chocolate.

3. The method of claim 2, wherein the chocolate is a compound chocolate.

4. The method of claim 3, wherein the eutectic mixture has an actual Mettler drop point temperature that is at least 2° C. lower than the weighted, calculated Mettler drop point temperature of the blend of the digestible vegetable fat and the esterified propoxylated glycerin.

5. The method of claim 3, wherein the eutectic mixture has a sharp melting profile comprising a transition from solid to liquid over a temperature range of less than about 3° C.

6. The method of claim 3, wherein the eutectic mixture comprises a crystal fat initiator.

7. The method of claim 6, wherein the food product is a confectionery product or baked good.

8. The method of claim 1, wherein the food product is selected from at least one of candy, a snack bar, a topping, a filling, a coating, a baking chip, a sweet good, a snack cake, a granola bar, a brownie, a filled cracker, a filled extruded snack, an enrobed extruded snack, a nougat, malted milk balls, aerated milk chocolate, or a puffed snack.

9. The method of claim 1, wherein the food product is substantially free of partially digestible fats which have a solid fat index of less than about 50 at 21° C.

10. The method of claim 1, wherein the esterified propoxylated glycerol has a degree of propoxylation of about 2 to about 8.

11. The method of claim 1, wherein the esterified propoxylated glycerol has a degree of propoxylation of about 3.

12. The method of claim 1, wherein the esterified propoxylated glycerol has a melting temperature of about 38° C. to about 42° C.

13. The method of claim 1, wherein the composition comprises a ratio of esterified propoxylated glycerol:digestible vegetable fat of from about 95:5 to about 5:95.

14. The method of claim 1, wherein the composition comprises a ratio of esterified propoxylated glycerol:digestible vegetable fat of from about 75:25 to about 25:75.

15. The method of claim 1, wherein the digestible vegetable fat and the esterified propoxylated glycerol are combined before being added to the at least one food component.

16. The method of claim 1, wherein the esterified propoxylated glycerol has a solid fat index of at least about 80 at 20° C.

17. An edible product comprising at least one food component, an esterified propoxylated glycerol having a solid fat index of at least 60 at 20° C. and a melting temperature of at least about 38° C., and a digestible vegetable fat that is hard, solid or semi-solid at room temperature selected from the group consisting of cocoa butter, palm kernel oil, palm kernel stearine, coconut oil, babassu oil and combinations thereof in natural, fractionated or hydrogenated states; the esterified propoxylated glycerol and the digestible vegetable fat being present in amounts sufficient to form a eutectic mixture melting at a temperature of at least about 30° C. and below about 37° C., an actual Mettler drop point temperature that is at least 1° C. lower than the weighted, calculated Mettler drop point temperature of a blend of the digestible vegetable fat and esterified propoxylated glycerol, and a sharp melting profile comprising a transition from solid to liquid over a temperature range of less than about 5° C.; and wherein the product is substantially free of partially digestible fats which have a solid fat index of less than about 50 at 21° C., whereby upon ingestion of the edible product by a subject the digestible vegetable fat is digested and absorbed and the esterified propoxylated glycerol solidifies in the digestive tract of the subject thereby reducing or preventing passive oil loss.

18. The edible product of claim 17, wherein the esterified propoxylated glycerol has a degree of propoxylation of about 2 to about 8.

19. The edible product of claim 17, wherein the esterified propoxylated glycerol has a degree of propoxylation of about 3.

20. The edible product of claim 17, wherein the melting temperature of the esterified propoxylated glycerol is about 38° C. to about 42° C.

21. The edible product of claim 17, wherein the edible product is a baked good or confectionery product.

22. The edible product of claim 17, wherein the edible product comprises chocolate.

23. The edible product of claim 17, wherein the edible product comprises compound chocolate.

24. The edible product of claim 17, wherein the composition comprises a ratio of esterified propoxylated glycerol:digestible vegetable fat of about 95:5 to about 5:95.

25. The edible product of claim 17, wherein the composition comprises a ratio of esterified propoxylated glycerol:digestible vegetable fat of from about 25:75 to about 75:25.

26. The edible product of claim 17, wherein the food product is selected from at least one of candy, a snack bar, a topping, a filling, a coating, a nougat, malted milk balls, aerated milk chocolate, a sweet good, a snack cake, a granola bar, a brownie, a filled cracker, a filled extruded snack, an enrobed extruded snack, a puffed snack and a baking chip.

27. The edible product of claim 17, wherein the eutectic mixture has a sharp melting profile comprising a transition from solid to liquid over a temperature range of less than about 3° C.

28. The edible product of claim 17, wherein the edible product is additionally comprised of a crystal fat initiator.

29. The edible product of claim 17, wherein the esterified propoxylated glycerol has a solid fat index of at least about 80 at 20° C.

* * * * *